United States Patent [19]

Abt et al.

[11] Patent Number: 4,947,254
[45] Date of Patent: Aug. 7, 1990

[54] LAYERED MIX EFFECTS SWITCHER ARCHITECTURE

[75] Inventors: John Abt, Nevada City; Richard S. Bannister, Grass Valley, both of Calif.

[73] Assignee: The Grass Valley Group, Inc., Nevada City, Calif.

[21] Appl. No.: 345,057

[22] Filed: Apr. 27, 1989

[51] Int. Cl.$^5$ .................... H04N 5/268; H04N 5/262; H04N 9/74
[52] U.S. Cl. .................................. 358/181; 358/183; 358/22
[58] Field of Search ................. 358/22, 181, 182, 183

[56] References Cited

U.S. PATENT DOCUMENTS

| | | | |
|---|---|---|---|
| 4,360,831 | 11/1982 | Kellar | 358/183 |
| 4,694,343 | 9/1987 | Flora | 358/183 |
| 4,758,892 | 7/1988 | Bloomfield | 358/22 |
| 4,851,912 | 7/1989 | Jackson el al. | 358/183 |
| 4,853,784 | 8/1989 | Abt et al. | 358/22 |

*Primary Examiner*—John K. Peng
*Attorney, Agent, or Firm*—Francis I. Gray

[57] ABSTRACT

A mix effects based switcher architecture provides for processing of video signals with associated key signals throughout, the mix effects (M/E) banks within the switcher outputting both a composited video signal and a composited key signal for use by subsequent M/E banks. The outputs of the M/E banks may be combined together before being input to an output M/E bank. The output M/E bank provides a layered video signal with associated composited key signal at the output of the switcher.

3 Claims, 3 Drawing Sheets

LAYERED MIX EFFECTS SWITCHER ARCHITECTURE

BACKGROUND OF THE INVENTION

The present invention relates to video switcher architectures, and more particularly to a layered mix effects switcher architecture that is an extension of a conventional mix effects based switcher architecture, the layered mix effects switcher architecture providing a parallel key path for each video path throughout the switcher, i.e., each video input and output has an associated key input and output.

The major functional blocks of a traditional mix effects based video switcher architecture, commonly called mix effects (M/E) banks, always output full screen video without an associated key. Key signals are only processed and used to composite video signals within the functional blocks, and are separate and limited in number with respect to the video inputs. With the advent of digital switchers the capabilities for mixing multiple layers of video signals are expanded. However the traditional mix effects based switcher architecture does not fit well into the digital compositing, or layering, world.

The traditional mix effects (M/E) based switchers implement a basic layering concept within a mix effects bank, but not between M/E banks. A conventional M/E bank has as inputs two background video sources without key and two "video with key" sources, where the keys may be developed from the video itself as "self" keys or may be external keys. The video with key sources are input to keyers in the M/E bank and are called the "fills", for the video, and the "hole-cutters", for the key. The output from the M/E bank is a full raster video signal with no key signal that represents the layering of the video signals composited with the background video according to their associated keys. To composite two character generators that are outputting some font video with associated key, the traditional switcher layers the two fonts, but also necessarily puts them over a background before M/E output.

What is desired is a mix effects based switcher architecture that can take advantage of the expanded capabilities of digital switchers by allowing an operator to turn the background off and output the composite video and an associated composite key from one M/E bank to allow re-entry into another M/E bank or output from the switcher. This allows many layers of video signals to be composited together while maintaining compatibility with traditional mix effects based switcher architectures.

SUMMARY OF THE INVENTION

Accordingly the present invention provides a layered mix effects switcher architecture that provides a parallel key path for each video path throughout the switcher. Each video input has its own key and the switcher has a key output in addition to the video output. Both the video and key signals are composited within the switcher so that for each video output from an M/E bank there is an associated composite key. The resulting composite video signals and associated composite key signals are combined to produce a layered composite video signal output from the switcher as well as a layered composite key signal.

The objects, advantages and other novel features of the present invention are apparent from the following detailed description when read in conjunction with the appended claims and attached drawing.

DESCRIPTION OF THE PREFERRED EMBODIMENT

As a matter of definition the word "composite" in the context of layering video signals means to combine as in the phrase "digital compositing." When referring to "composite" as opposed to "component" video signals, that term refers to the appropriate television standard, such as NTSC or PAL, where a chrominance information signal is modulated onto a subcarrier and added to a luminance information signal with appropriate timing information signals. Further there are two types of video information signals with keys. One is a full raster video signal with a key signal where there is video even in those spatial areas where the key signal is zero, i.e., the video signal has not yet been multiplied by its key signal—"unshaped" video. The other type is known as "shaped" video where the video signal occurs only where the key is not zero. The switcher architecture described below accepts both types of video and key representations.

Figure 1:
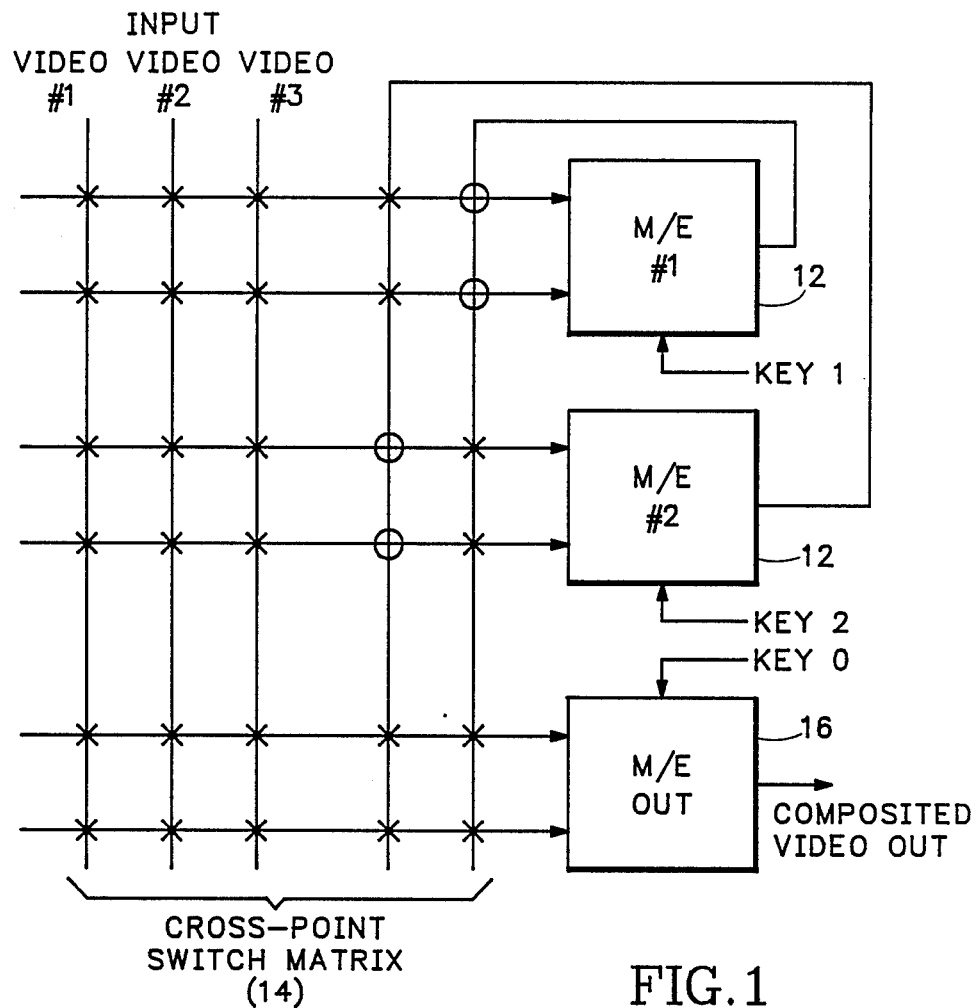
FIG. 1 is a block diagram of a conventional mix effects based switcher architecture.

In the conventional mix effects based switcher architecture, as shown in FIG. 1, video input signals are input to a plurality of mix effect banks 12 via a cross-point switching matrix 14. An external key signal is input to each M/E bank 12 to composite two video input signals from the cross-point switching matrix 14 together. The output of each M/E bank 12 is input back to the cross-point switching matrix 14 so that it is available for further compositing with other video input signals. The final switcher output is taken from an output M/E bank 16 to produce an output composited video signal.

Figure 2:
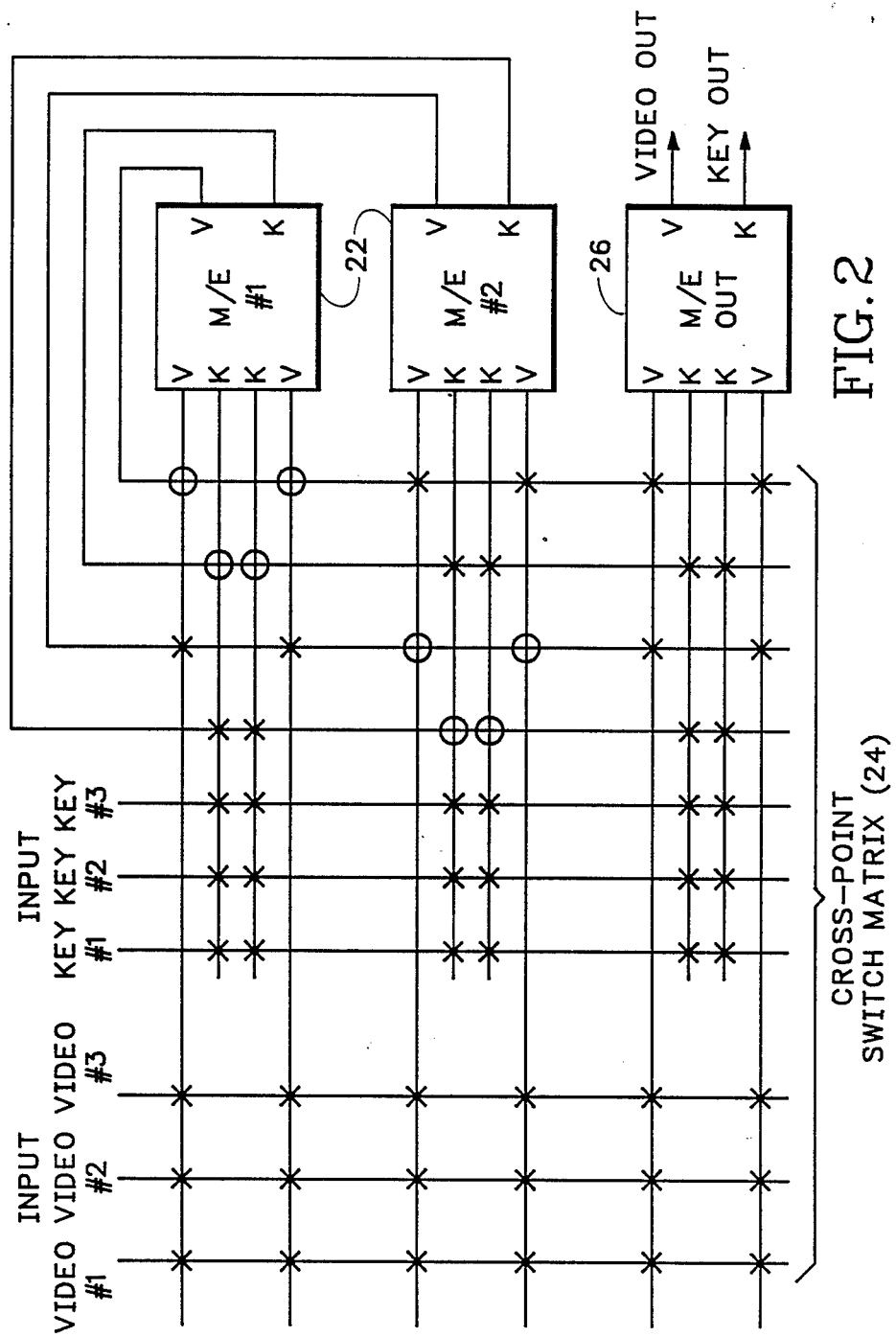
FIG. 2 is a block diagram of a layered mix effects switcher architecture according to the present invention.

Referring now to FIG. 2 each input video signal has an associated key signal that also is input to a cross-point switch matrix 24. Some video signal inputs may not have an associated key signal, such as a video signal from a camera, so an internal default key is provided by the mix effects bank 22. The default key generally is a key signal that is valid over the entire raster. The inputs to the mix effects banks 22 are the selected video signals and their associated key signals. These key signals may be either external key signals or key signals generated from the associated video signal itself. Key signals generated by the video signal itself are known as "self" keys, such as luminance or chrominance keys, and may be generated inside the M/E bank 22, in which case the generated key signal is not in the cross-point switch matrix 24. However if the self keyer is a separate functional block outside the M/E bank 22, then both the video signal and the generated self key signal are input to the cross-point switch matrix 24.

Figure 3:
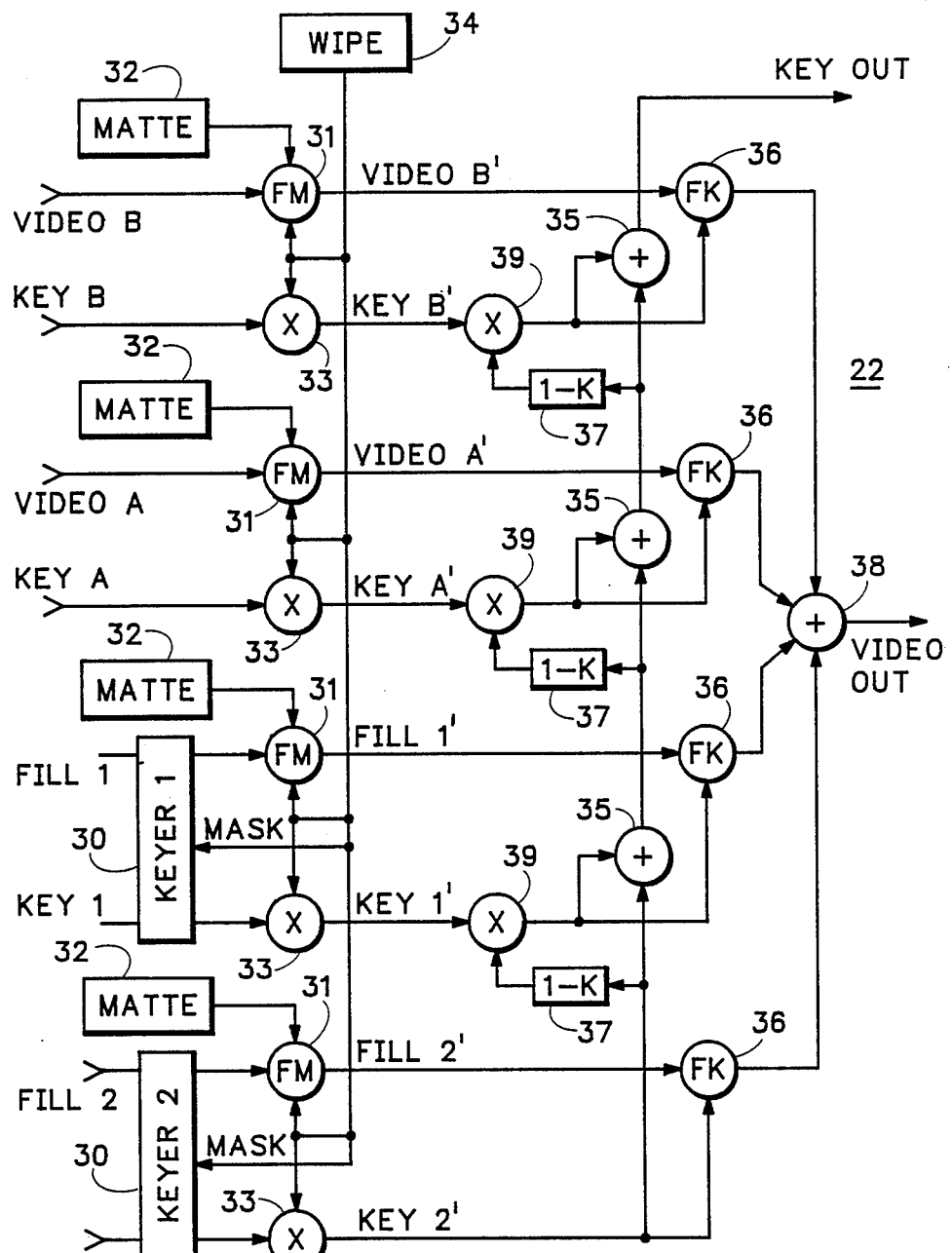
FIG. 3 is a block diagram of a mix effects bank having both a video and key output signal according to the present invention.

An M/E bank 22 has four video input signals and four associated key signals, such as VIDEO A, VIDEO B, FILL 1, FILL 2, KEY B, KEY A, KEY 1, and KEY 2 as shown in FIG. 3. The fill video signals and associated key signals are input to respective keyers 30 that provide a shaped video and associated key signal output. The video signals are input to respective video mixers (FM) 31 to which also are input a matte signal from respective MATTE generators 32 and a wipe signal from a WIPE generator 34. The WIPE generator 34 also provides a MASK signal input to the keyers 30. The associated key signals are combined with the wipe signal in associated multipliers 33. The video signals from the FMs 31 are input to respective keyers (FK) 36 where they are combined with an appropriate derived key signal according to the layer of the video signal. The shaped video outputs from the FKs 36 are combined in a summing circuit 38 to produce the final output video signal from the M/E bank 22. The key signal KEY 2' is input to the first of a series of adders 35 and to a complement circuit (1-K) 37. Likewise the outputs of the first two adders 35 are input to respective complement circuits 37. The output of the complement circuits 37 are combined with the associated key signals KEY 1', KEY A' and KEY B' in multipliers 39, the outputs of the multipliers being input to the respective adders 35 of the chain. The output of the last adder in the chain is the key signal output for the M/E bank 22.

The outputs of the M/E banks 22 are a composited video signal and an associated key signal. The outputs of the M/E banks 22 are returned to the cross-point switch matrix 24 for further layering and eventually for input to the output M/E bank 26. The final output of the switcher from the output M/E bank 26 is a layered composited video signal and a layered composited key signal. The M/E bank 26 may be configured as a Program/Preset block and a Downstream Keyer (DSK). Even if the key signal output from the switcher is not used, the M/E bank 22 key signal outputs are still useful. For example if the first M/E bank 22 is outputting a composite of four video signal with associated key signal, the video signal output with associated key signal may be used as a source for another keyer in the switcher, such as the DSK, even if the switcher output is always full-screen video.

Thus the present invention provides a novel mix effects based switcher architecture having key signals associated with all video signals throughout the effects processing within the switcher to produce a layered output video signal with associated composited key signal.

What is claimed is:

1. A layered mix effects switcher architecture comprising:
a plurality of means for mixing video signals together, each mixing means layering a plurality of video signals together according to associated key signals for each video signal to form a composited video signal and an associated composited key signal; and
means for combining the composited video signals from the plurality of mixing means according to the associated composited key signals to produce a layered video signal and associated layered key signal.

2. A switcher architecture as recited in claim 1 further comprising means for selecting from among a plurality of input video signals and associated external key signals as well as from the composited video signals and associated composited key signals those video signals and key signals for input to each of the plurality of mixing means required to produce the output layered video signal and associated layered key signal.

3. An improved mix effects based switcher architecture of the type having a plurality of mix effects banks for mixing video input signals according to an input key signal, each mix effects bank producing a composited video output signal, one of the mix effects being an output mix effects bank for combining video signals selected from the group consisting of the composited video output signals and the video input signals to produce an output video signal, wherein the improvement comprises means within each mix effects bank for generating an associated composited key signal for each composited video output signal and for the output video signal, the associated composited key signals being formed in the respective mix effects banks in a manner consistent with the formation of the composited video output signal and of the output video signal, the output of the switcher being the output video signal and its associated composited key signal.

* * * * *